United States Patent
Breban

(10) Patent No.: US 9,950,809 B2
(45) Date of Patent: Apr. 24, 2018

(54) SYSTEM FOR ASSISTING IN A DISPATCH DECISION OF AN AIRCRAFT AND RELATED PROCESS

(71) Applicant: DASSAULT AVIATION, Paris (FR)

(72) Inventor: Rémi Breban, Saint Aubin de Medoc (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 15/418,705

(22) Filed: Jan. 28, 2017

(65) Prior Publication Data
US 2017/0217602 A1    Aug. 3, 2017

(30) Foreign Application Priority Data
Feb. 2, 2016    (FR) ..................... 16 00178

(51) Int. Cl.
| G08B 21/00 | (2006.01) |
| B64D 45/00 | (2006.01) |
| G05B 23/02 | (2006.01) |

(52) U.S. Cl.
CPC ......... B64D 45/00 (2013.01); G05B 23/0272 (2013.01)

(58) Field of Classification Search
CPC .... B64D 45/00; B64D 43/00; B64D 2045/07; B64D 2045/0085; B64D 11/00; B64D 47/06; G08G 5/0021; G08G 5/003; G08G 5/0047; G08G 5/0034; G01C 23/00; G05B 23/0272
USPC ........ 340/945, 963, 959, 964, 971, 973–975
See application file for complete search history.

(56) References Cited

U.S. PATENT DOCUMENTS

| 2002/0138184 A1 | 9/2002 | Kipersztok et al. |
| 2004/0111197 A1 | 6/2004 | Kipersztok et al. |
| 2009/0326738 A1 | 12/2009 | Ferro |
| 2010/0049379 A1 | 2/2010 | Vial |
| 2010/0198431 A1 | 8/2010 | Corbefin |
| 2011/0040156 A1* | 2/2011 | Vij ................... A61B 5/18 600/301 |
| 2012/0139894 A1 | 6/2012 | Nathan et al. |

(Continued)

FOREIGN PATENT DOCUMENTS

| EP | 1 236 986 A2 | 9/2002 |
| FR | 2 916 548 A1 | 11/2008 |

(Continued)

OTHER PUBLICATIONS

Search Report of French priority application.

*Primary Examiner* — Anh V La
(74) *Attorney, Agent, or Firm* — Davidson, Davidson & Kappel, LLC

(57) ABSTRACT

A system for assisting in a dispatch decision of an aircraft and related process are provided. The system includes a synthesis module, configured to generate at least one dispatch status for the aircraft, based on at least one defect and/or fault datum of the aircraft received from the acquisition module and at least data contained in a first database and in a second minimum equipment list database; and a display, configured to display at least one synthesis window containing at least one defect and/or fault identification indicator of the aircraft developed from the or each defect and/or fault datum, and at least one dispatch status indicator based on the dispatch status determined by the synthesis module.

13 Claims, 6 Drawing Sheets

(56) References Cited

U.S. PATENT DOCUMENTS

| | | | | |
|---|---|---|---|---|
| 2012/0256768 A1* | 10/2012 | Kratchounova | ....... | G01C 23/00 340/973 |
| 2015/0187148 A1* | 7/2015 | Sannino | ............. | G06F 11/0739 701/29.2 |
| 2015/0298816 A1* | 10/2015 | Ouellette | ............... | B64D 43/00 701/3 |
| 2017/0088285 A1* | 3/2017 | Wischmeyer | .......... | B64D 45/00 |

FOREIGN PATENT DOCUMENTS

| | | |
|---|---|---|
| FR | 2 917 521 A1 | 12/2008 |
| FR | 2 946 023 A1 | 12/2010 |

* cited by examiner

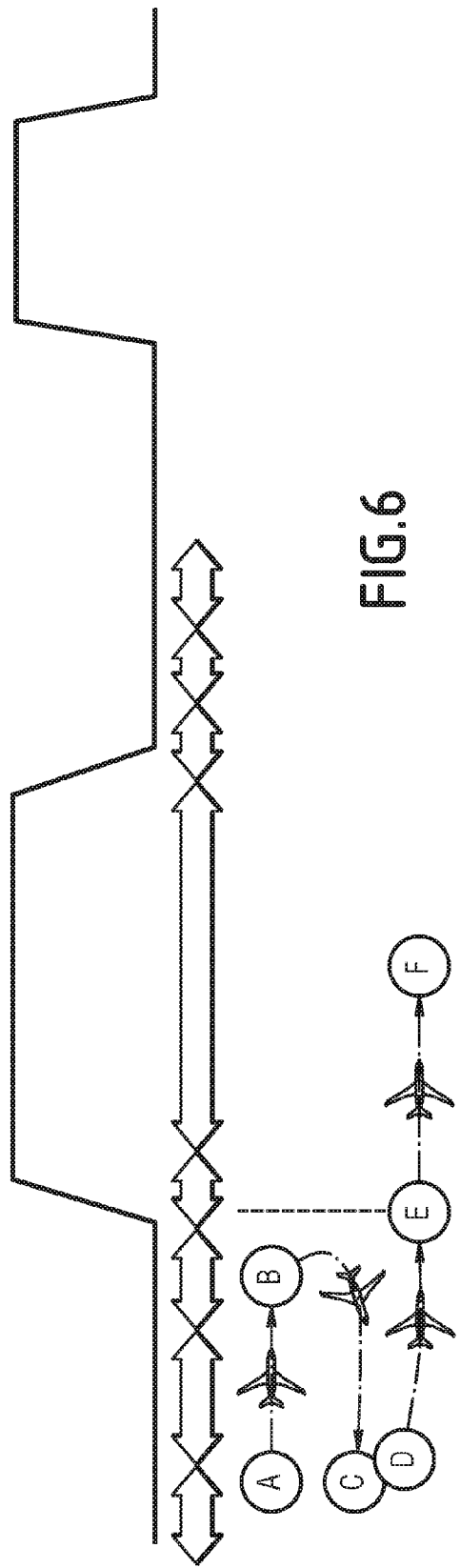

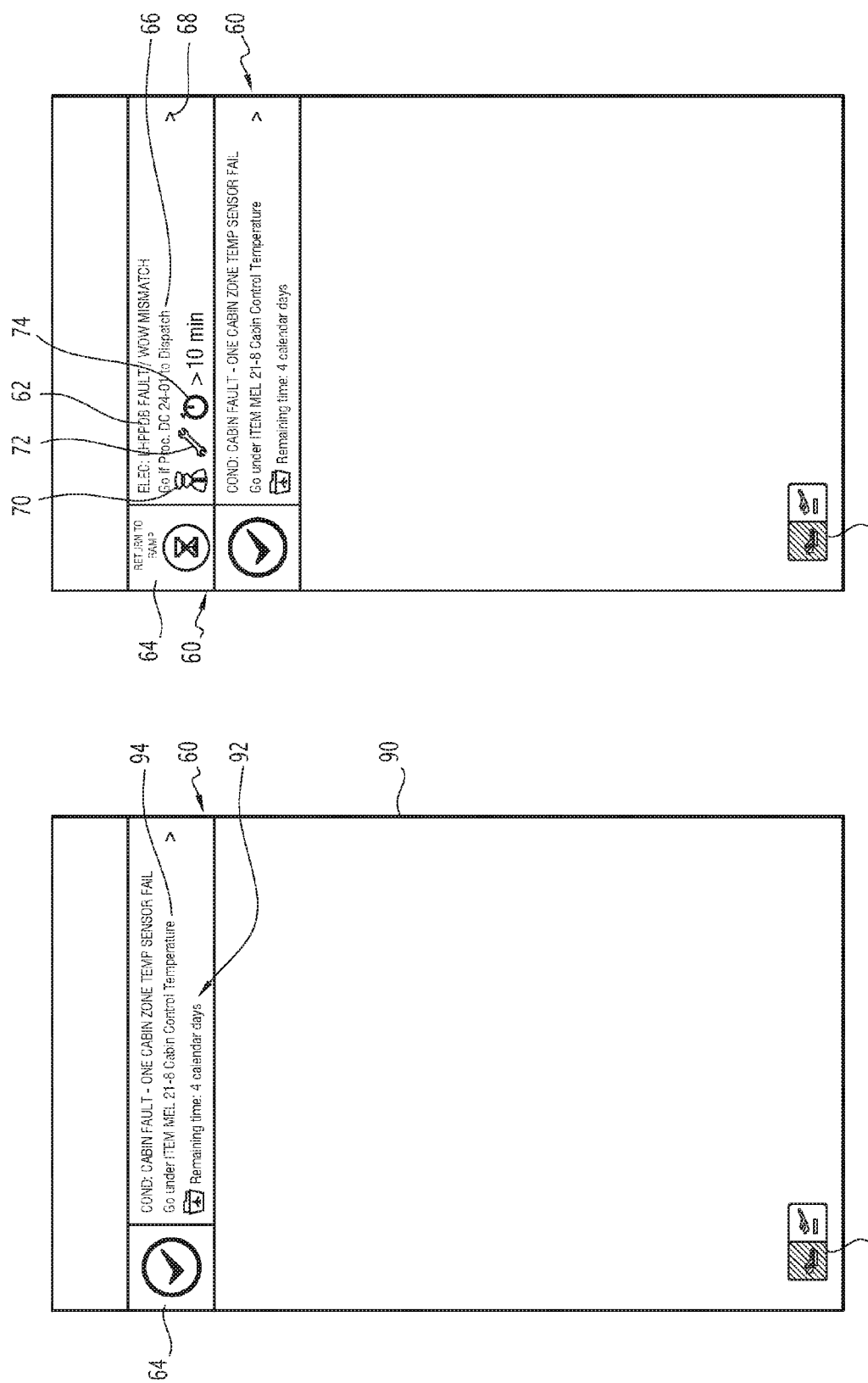

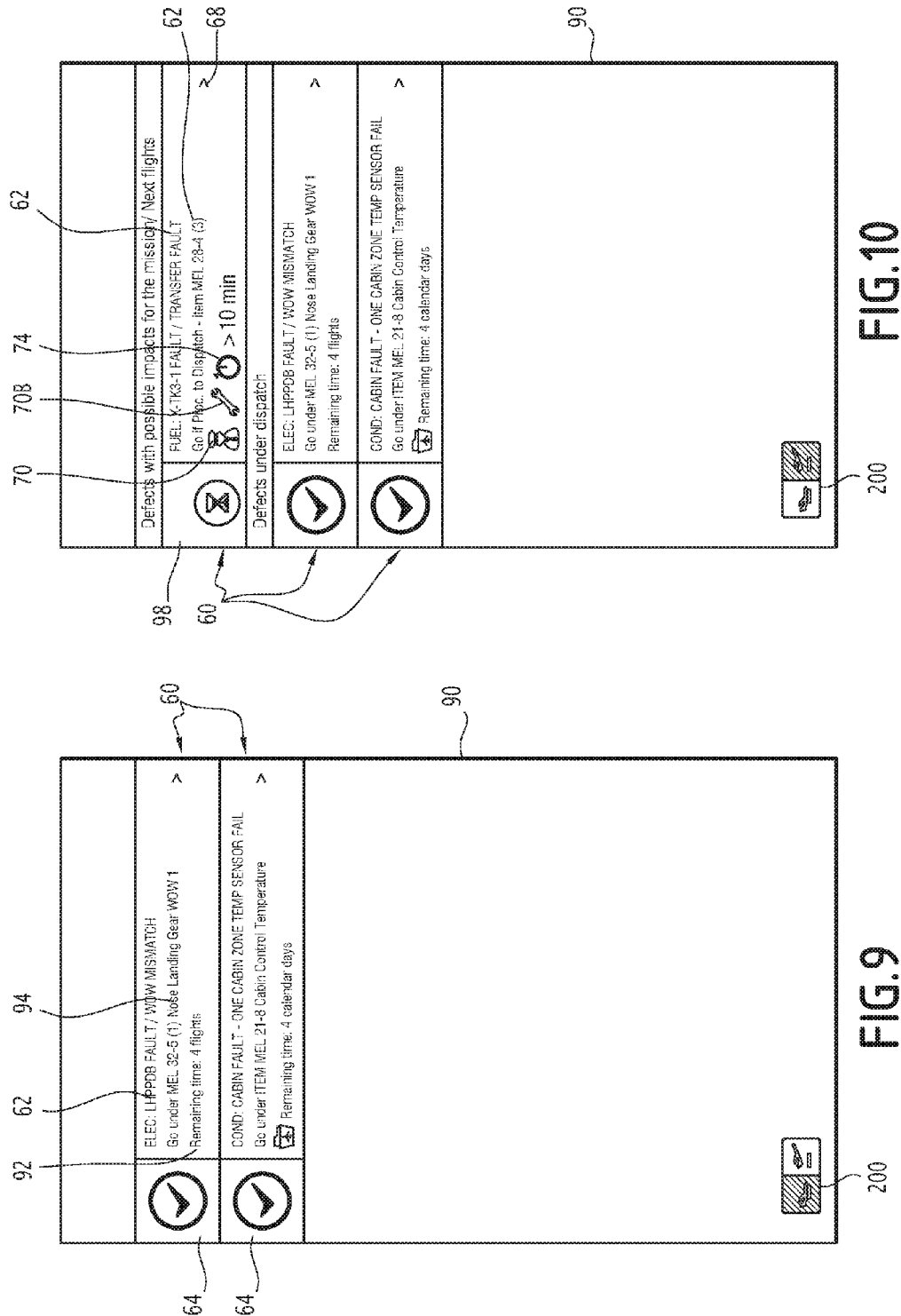

SYSTEM FOR ASSISTING IN A DISPATCH DECISION OF AN AIRCRAFT AND RELATED PROCESS

This claims the benefit of French Patent Application FR 16 00178, filed Feb. 2, 2016 and hereby incorporated by reference herein.

The present disclosure relates to a system for assisting in a dispatch decision of an aircraft, including:
- an acquisition module for acquiring aircraft defect and/or fault data;
- at least one first identification database, able to associate at least one potentially implicated piece of equipment and/or system and/or function of the aircraft with at least one defect and/or fault datum of the aircraft received from the acquisition module;
- a second minimum equipment list database defining dispatch conditions of the aircraft based on potentially implicated equipment and/or systems and/or functions of the aircraft.

Such a system is intended to be present in the cockpit of an aircraft to assist the crew when making dispatch decisions, when defects and/or faults are present on at least one piece of equipment of the aircraft.

Given the complexity of the systems making up an aircraft, in some cases the aircraft has defects and/or faults on certain pieces of equipment before takeoff.

Certain defects and/or faults are critical and prohibit the aircraft from taking off, to guarantee that safety constraints are met. However, other defects and/or faults are less critical, in particular given the redundancy of the systems on the aircraft or the low impact of the implicated systems on the conduct of the flight.

In this case, if a repair is not immediately possible or desirable, for example if the terrain on which the aircraft is located does not have adequate maintenance means, or if operational constraints require it, in some cases the aircraft may have a dispatch.

The dispatch decision must be made by the crew of the aircraft, in particular based on the defect and/or fault data that the crew reads in the cockpit and the available documentation, by analyzing the operational situation of the aircraft.

BACKGROUND

The available documentation is complex and lengthy. It includes several manuals.

In particular, the documentation includes at least a minimum equipment list that defines, piece by piece of equipment, the configurations in which the aircraft may have a dispatch, despite the defects and/or faults.

The link between the observed defects and/or faults and the implicated pieces of equipment is not always easy to determine. Manuals such as a pilot assistance list, a configuration deviation list, a maintenance and operating procedures manual, and a dispatch assistance defect guide make it possible to establish connections between the observed defects and/or faults and the implicated pieces of equipment and/or systems and/or functions when this is identifiable. For complex defect/fault cases, procedures aiming to isolate the problem are described to be carried out before identifying the possible connection with a piece of equipment and/or system and/or function.

In the presence of an observed defect and/or fault on the monitors of the aircraft or a defect that is felt and/or visible inside or outside the airplane, the crew must first verify, in the pilot assistance list, whether this defect is an artifact. If it is not, the crew must then consult the defect guide to determine the involved piece of equipment and/or system and/or function and the procedures to be followed.

The crew must next refer to the appropriate item(s) and the minimum equipment list and check, in each item, whether the conditions are met for a dispatch, in particular given the operational constraints.

SUMMARY OF THE INVENTION

Such a method is not fully satisfactory. The aforementioned documentation is quite cumbersome, and may comprise several hundred pages. The information to be consulted is distributed over several paper documents and requires going from one document to another, writing down the analyses as one goes along in order to follow and memorize the choices that have been made.

Subsequently, the time necessary before having an operational status allowing a decision to be made may be long. Furthermore, it is very difficult for the crew to anticipate whether the analysis will lead to a return to the ramp, if it is necessary to reset the aircraft, and/or whether the crew will be able to resolve the problem itself, or if outside assistance will be needed. This may be detrimental to the proper progression of the mission, as well as passenger comfort.

One aim of the invention is to obtain an assistance system that simplifies the aircraft crew's task in the dispatch decision, decreases the decision-making time and anticipates, if possible, the operational consequences of observed defects and/or faults, or that initializes an impact/constraint analysis for the next flight.

To that end, a system is provided that includes:
- a synthesis module, able to generate at least one dispatch status for the aircraft, based on at least one defect and/or fault datum of the aircraft received from the acquisition module and on at least data contained in the first database and in the second database;
- a display, able to display at least one synthesis window containing at least one defect and/or fault identification indicator of the aircraft developed from the or each defect and/or fault datum, and at least one dispatch status indicator based on the dispatch status determined by the synthesis module.

The system according to the invention may comprise one or more of the following features, considered alone or according to any technically possible combination:
- the defect and/or fault datum is a defect and/or fault reference, a CAS message, a message identifying a fault message and root cause, a cockpit alert means such as a message on a monitor or another indication, status feedback for actions taken during a procedure, feedback from an analysis done by the crew, an airplane system, equipment or function status, and/or a maintenance message.
- the synthesis module is able to generate at least one rapid dispatch status for the aircraft, based on at least one defect and/or fault datum of the aircraft received from the acquisition module and on at least data contained in the first database and in the second database, the rapid dispatch status being determined from among a non-dispatch, an established dispatch, an analysis that may be done on-site, and/or an analysis requiring a return to the ramp, the display being able to display, in the synthesis window, at least one rapid dispatch status indicator based on the rapid dispatch status determined by the synthesis module;

the synthesis module is able to generate at least one detailed dispatch status establishing an operational impact, based on at least one defect and/or fault datum of the aircraft received from the acquisition module and on at least data contained in the first database and in the second database, the display being able to display, in the synthesis window, at least one detailed dispatch status indicator based on the detailed dispatch status determined by the synthesis module;

the detailed dispatch status generated by the synthesis module includes at least one piece of information regarding a procedure to be followed from the minimum equipment list to decide on the dispatch, the display being able to display a detailed status indicator identifying the procedure to be followed based on the information regarding the procedure to be followed generated by the synthesis module.

the display is able to display, in the synthesis window, at least one determination status for the state of a procedure to be followed;

the detailed dispatch status generated by the synthesis module includes at least one piece of information estimating the minimum time necessary for the dispatch decision, the display being able to display a detailed status giving an estimate of the minimum time necessary to establish the dispatch based on the minimum time estimate information generated by the synthesis module;

the detailed dispatch status generated by the synthesis module includes a piece of information regarding the need for outside assistance to decide on the dispatch, the display being able to display a detailed status indicator relative to a need for outside assistance based on the need for outside assistance information generated by the synthesis module;

the detailed dispatch status generated by the synthesis module includes a piece of information regarding the need to reset the aircraft's systems to decide on the dispatch, the display being able to display a detailed status indicator relative to a reset need based on the reset need information generated by the synthesis module;

the detailed dispatch status generated by the synthesis module includes a piece of information regarding an operational limitation of the aircraft on at least one upcoming flight, the display being able to display a detailed status indicator relative to the operational limitation based on the operational limitation information generated by the synthesis module;

the synthesis module is able to establish at least one detailed dispatch status on the ground and in flight constituting an estimate for an upcoming departure, the display being able to display the or each operational impact detailed status on the ground and in flight;

it includes at least one database to assist with isolation and orientation toward an item from the minimum equipment list, an operating and maintenance procedures database, and/or a deviation configuration list database, the synthesis module being able to generate at least one dispatch status from the data contained in the database to assist with isolation and orientation toward an item from the minimum equipment list, in the operating and maintenance procedure database, and/or in the deviation configuration list database;

it includes at least one fleet defect and/or fault database, the synthesis module further being able to query the fleet defect and/or fault database in the presence of a defect and/or fault datum collected by the acquisition module;

after a dispatch is established in the presence of a defect and/or fault datum of the aircraft, the display is able to display a remaining number of flights and/or duration for the dispatch in the synthesis window;

the defect and/or fault data acquisition module is able to detect the defect and/or fault information of the aircraft automatically, and/or includes an interface for manually entering defect and/or fault information of the aircraft.

A method for assisting in a dispatch decision of an aircraft is also provided including the following steps:

providing a system as defined above;

acquiring, by the acquisition module, at least one defect and/or fault datum of the aircraft;

generating, by the synthesis module, a dispatch status for the aircraft, based on at least one defect and/or fault datum of the aircraft received from the acquisition module and on at least data contained in the first database and in the second database;

displaying, in a synthesis window, at least one defect and/or fault identification indicator of the aircraft and a dispatch status indicator determined by the synthesis module based on the defect and/or fault datum of the aircraft.

The method according to the invention may comprise one or more of the following features, considered alone or according to any technically possible combination:

generating at least one rapid dispatch status for the aircraft, based on at least one defect and/or fault datum of the aircraft received from the acquisition module and on at least data contained in the first database and in the second database, the rapid dispatch status being determined from among a non-dispatch, an established dispatch, an analysis that may be done on-site, and/or an analysis requiring a return to the ramp, the display displaying, in the synthesis window, at least one rapid dispatch status indicator based on the rapid dispatch status generated by the synthesis module;

generating at least one detailed dispatch status establishing an operational impact, based on at least one defect and/or fault datum of the aircraft received from the acquisition module and at least data contained in the first database and in the second database, the display displaying, in the synthesis window, at least one detailed dispatch status indicator based on the detailed dispatch status generated by the synthesis module.

BRIEF SUMMARY OF THE DRAWINGS

The invention will be better understood upon reading the following description, provided solely as an example and done in reference to the appended drawings, in which:

FIG. 6 illustrates several successive steps for implementing the method of FIG. 5;

FIGS. 7 to 10 illustrate the successive display of synthesis windows on the display of the system of FIG. 1, during the implementation of the method of FIG. 5.

DETAILED DESCRIPTION

Figure 1:
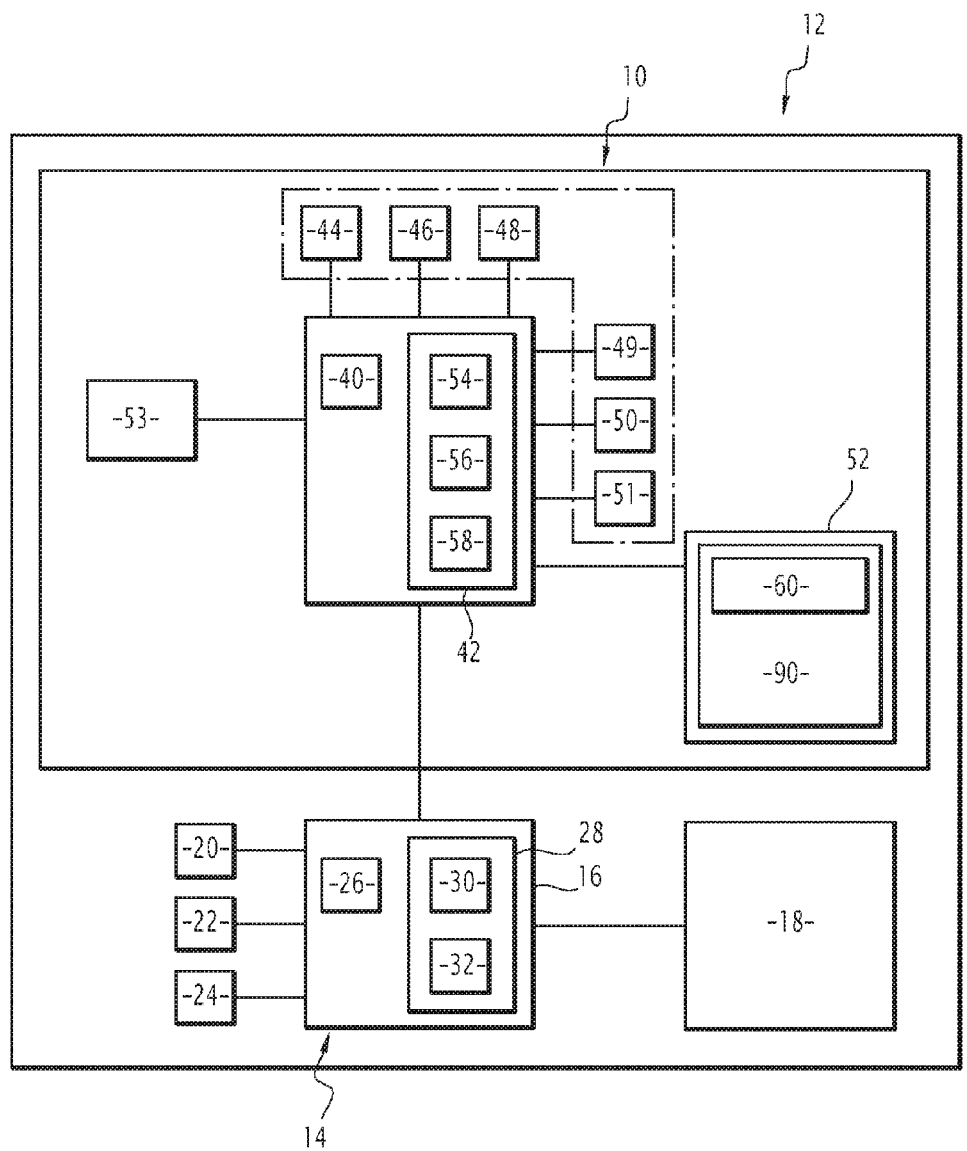
FIG. 1 is a diagrammatic view of a first system for assisting in the dispatch decision according to an embodiment of the invention.

A first system 10 for assisting in the dispatch decision of an aircraft 12 according to an embodiment of the invention is illustrated by FIG. 1.

The system 10 is intended to be connected to a central avionics system 14 comprising a central avionics unit 16 and a display unit 18 placed in the cockpit of the aircraft 12.

The system 10 is for example permanently integrated into the cockpit of the aircraft 12 within the central avionics unit 16 or connected therewith.

Alternatively, the system 10 is placed in a portable electronic device, such as a tablet. Such a device is called "electronic flight bag". This device is then able to exchange data with the central avionics unit 16 and optionally with maintenance centers and/or operational offices, via a communication assembly, which is in particular wireless.

The dispatch decision is in particular made by the crew of the aircraft in the presence of an operating defect or a fault of at least one piece of equipment and/or system and/or function of the aircraft noted on the ground, before takeoff of the aircraft.

The dispatch decision is made based on specific conditions, defined with the certifying authorities. To that end, a list of items (pieces of equipment and/or systems and/or functions) is defined that may be temporarily nonfunctional with conditions to be met and takes into account operational limitations, procedures, verifications for a given airplane in order to ensure that the flight can be conducted in complete safety.

The central avionics unit 16 is in particular connected to measuring systems 20 on the aircraft, outside communication systems 22, and systems 24 actuating controls of the aircraft.

The measuring systems 20 for example include sensors for measuring parameters outside the aircraft, such as the temperature, pressure or speed, sensors for measuring parameters inside the aircraft and its various functional systems, and positioning sensors, such as GPS sensors, inertial units, and/or an altimeter.

The outside communication systems 22 for example include radio, VOR/LOC, ADS, DME, ILS, NLS systems, radar systems, and/or satellite communication systems such as "SATCOM".

The control systems 24 include actuators able to actuate orders of the aircraft, such as flaps, control surfaces, pumps, or mechanical, electric and/or hydraulic circuits, and software actuators able to configure the avionics states of the aircraft.

The various systems 20 to 24 are connected to the central control unit 14, for example digitally, by at least one data bus circulating on a network inside the aircraft.

The central unit 14 includes at least one computer 26 and a memory 28 able to receive the information from the different systems 20 to 24 and process them, and optionally to control the systems 24 to carry out procedural actions.

In particular, the memory 28 contains at least one software application 30 for detection defects and/or faults on the pieces of equipment of the systems 20 to 24 of the aircraft. It optionally comprises at least one application 32 for the display and/or automatic or semiautomatic or manual performance of procedures associated with the observed defects and faults.

The software application 30 is able to be executed by the computer 26 to detect the appearance of defects and/or faults on the various systems 20 to 24 of the aircraft 12 and to escalate the observed defects and/or faults in a codified manner, generally by associating them with a defect reference, a defect root cause, a specific flag in the cockpit displays, or a crew alerting system (CAS) message.

The defect and/or fault, root cause, and alerting system references are generally displayed on one or several status windows of the display unit 18, advantageously situated between the seats of the cockpit. The CAS messages are generally displayed in a specific CAS window, situated across from each seat of the cockpit.

The software application 32 is able to be executed by the computer 26 to allow the loading of procedures associated with the appearance of defects and/or faults and to allow the manual, semiautomatic or automatic performance of the procedures.

Alternatively, if the system 10 is integrated into a portable electronic device, the software application 32 is able to be executed directly by the system 10.

In reference to FIG. 1, the dispatch decision assistance system 10 includes at least a computer 40 and a memory 42 containing software modules able to be executed by the computer 40. The system 10 further includes databases 44 to 50, including at least one first database 44 for identifying defects and faults and at least one second minimum equipment list database 46. It includes a display 52 and a man-machine interface 53.

The memory 42 in particular contains a defect and/or fault acquisition software module 54 and an operational synthesis software module 56, intended to determine dispatch statuses of the defect and/or fault databases received from the acquisition module 54, and data taken from the databases 44 to 50, as will be seen below. It further advantageously contains a software module 58 for managing the display on the display 52.

The acquisition module 54 is able to query the avionics unit 16 to recover defect and/or fault identification data generated by the software application 30.

These identification and context data are for example defect and/or fault references, defect root causes, CAS messages, flagging means, or maintenance messages.

The acquisition module 54 is further able to receive defect and/or fault identification data entered manually by the crew using the man-machine interface 53. These data are for example defects/faults available in the database 44, equipment and/or system and/or function references, or structural elements of the airplane present in the databases 44 to 50. These data can also be status feedback on actions performed during procedures, or feedback on analyses done by the pilot.

Optionally, the acquisition module 54 is able to acquire contextual data, such as data on the flight phase, date and time data, airplane configuration data, maintenance data, in particular, mission data, departure/arrival airports, mission type, flight plan elements, or parameters from the airplane systems.

The man-machine interface 53 for example includes a physical and/or software keyboard, and/or a selection and control member to scroll through menus and/or enter information.

Among the databases 44 to 51, at least a first identification database 44 advantageously associates the defect and/or fault data received by the acquisition module 54 with one or several pieces of equipment and/or systems and/or functions of the aircraft 12 that may be implicated.

In particular, the first identification database 44 contains a plurality of defect and/or fault signatures that are potentially each associated with one or several pieces of equipment and/or systems and/or functions that may potentially be implicated. Each signature is made up of at least one defect and/or fault identification datum, and optionally contextual data, as defined above.

The minimum equipment list database 46 associates each of a plurality of potentially implicated pieces of equipment and/or systems and/or functions with at least one minimum equipment list item.

Each minimum equipment list item corresponding to a potentially implicated piece of equipment and/or system and/or function defines the conditions under which the aircraft 12 may be given dispatch, if the piece of equipment and/or system and/or function in question is faulty. It in particular defines the minimum number of pieces of equipment and/or systems and/or functions in use that must be present in the aircraft 12, the verification(s) that must be done to decide whether to grant dispatch, the entity responsible for performing the verification, to be chosen from among the crew and/or a qualified maintenance operator, and the number of flights or time during which the aircraft 12 may be in flight without the implicated equipment and/or systems and/or functions working.

Advantageously, the database 46 includes, for each item, an indication of the estimated time needed to perform the verification, an indication of the need to reset systems of the aircraft, if the verification associated with the item involves such a reset.

The database 46 is established from certified data present in a master minimum equipment list (MMEL), defined by the builder of the aircraft, which allows the operator in turn to generate a minimum equipment list associated with the specific aircraft 12.

In the example shown in FIG. 1, the system 10 optionally includes at least a third database 48 to assist with the isolation and orientation toward an item from the minimum equipment list, an operating and maintenance procedures database 50, and optionally a deviation configuration list database 49, and a known fleet problems database 51.

The database to assist with the isolation and orientation toward an item from the minimum equipment list 48 for example includes a list of actions and/or procedures to be followed before consulting a particular item from the minimum equipment list, based on the piece(s) of equipment and/or systems and/or functions potentially implicated. This database makes it possible to assist the pilot in finding the most relevant item(s) from the minimum equipment list with the defect and/or fault data recovered by the acquisition module 54, in particular when the identification of this item is not clear from the database 44, given the observed defect and/or fault signature.

Advantageously, the database 48 includes, for each procedure or action that it contains, an indication of the estimated time needed to carry out the procedure or action, and an indication of the need to reset systems of the aircraft 12 to implement the procedure.

The operating and maintenance procedures database 50 includes a list of maintenance procedures and operations to perform on the potentially implicated piece of equipment and/or system and/or function, after or during verifications to be done associated with an item from the minimum equipment list.

It advantageously includes, for each procedure that it contains, an indication of the estimated time needed to carry out the procedure, and an indication of the need to reset systems of the aircraft 12 to implement the procedure.

The deviation configuration list database 49 associates at least one item from the associated deviation configuration list with a plurality of potentially defective outside parts of the aircraft.

Each deviation configuration list item corresponding to a potentially defective outside part defines the conditions under which the aircraft 12 may be given dispatch if the outside part in question is defective.

These outside parts are for example secondary structural elements and/or parts, communication antennas of the ATC, VOR type.

It in particular defines the procedures that must be carried out to establish the discharge, the entity responsible for carrying out the procedure, to be chosen from among the crew and/or the outside maintenance operator, and the number of flights or the time during which the aircraft 12 can be in flight when the outside parts are potentially defective.

It advantageously includes, for each verification that it contains, an indication of the estimated time needed to carry out the verification, and an indication of the need to reset systems of the aircraft 12 to implement the verification.

The database 51 of known fleet problems identifies the defect and/or fault signatures constituting artifacts or minor defects shared by a group of aircraft 12, in particular the aircraft fleet 12, that should not be addressed by a minimum equipment list.

Each database 44 to 51 is physically received in the memory 42 and/or is accessible by the computer 40, by connection through a physical and/or wireless link.

In this example, the databases 44 to 51 are shown separate from one another. In one alternative, shown in dotted lines in FIG. 1, at least two databases 44 to 51, advantageously all of the databases 44 to 51, are aggregated in a shared database.

The operational synthesis module 56 includes a querying application, querying at each moment before the flight, and advantageously during the flight, the acquisition module 54 in order to collect the defect and/or fault data acquired by the acquisition module 54, so as to determine a signature representative of the defects and/or faults present in the aircraft 12 at that moment.

Advantageously, when a database 51 of known fleet problems is present, the operational synthesis module 56 is able to query the database of known fleet problems 51 in order to determine whether one or several defects and/or faults constituting the signature constitute(s) an artifact or a minor defect that should not be considered as part of a minimum equipment list for a dispatch.

The operational synthesis module 56 includes an application for generating a rapid dispatch status for the aircraft, based on at least one recovered defect and/or fault signature, based on at least data contained in the first identification database 44 and on at least data contained in the second minimum equipment list database 46.

Advantageously, the rapid dispatch status is also determined from other databases 48 to 50 in order to determine a time estimate and/or reset need, in order to consolidate whether a return to ramp is necessary.

To that end, the application for establishing a rapid status is able to query the first database 44 and optionally the database 48 in order to identify the potentially implicated piece(s) of equipment and/or systems and/or functions corresponding to the collected signature.

The application for establishing a rapid status is next able to query the second database 46 in order to determine whether each potentially implicated piece of equipment and/or system and/or function isolated using the database 44 and/or the database 48 has at least one item in the minimum equipment list.

If the potentially implicated piece of equipment has no item in the minimum equipment list defined in the database 46, the application for establishing a rapid status then generates a non-dispatch rapid status.

If the potentially implicated piece of equipment has at least one item in the minimum equipment list, the application for establishing a rapid status is able to determine the number of items corresponding to the potentially implicated piece of equipment.

For each item associated with the potentially implicated piece of equipment, the application for establishing a rapid status is able to determine a rapid status chosen from among: dispatch established, analysis able to be done on-site, and/or analysis requiring a return to ramp.

The operational synthesis module 56 further includes an application for establishing a detailed dispatch status of the aircraft, comprising at least one operational impact detailed status indication, based on the defect and/or fault signature recovered by the acquisition module 54 and data contained in the database 44 to 48, and advantageously in the databases 49 to 51.

To that end, the application for establishing a detailed status is able to scan the verifications associated with each item from the minimum equipment list in the database 46 in order to identify the verification and determine whether each procedure may be carried out by only the crew, or if it requires assistance from an outside maintenance operator. It is thus able to define an indication of any need for outside assistance.

The application for establishing a detailed status is further able to scan the verifications associated with each item from the minimum equipment list in the database 46, and optionally the procedures associated with each defect/fault in the database to assist with isolating items 48, in the configurations list database 49, and/or in the maintenance and operating database 50 in order to determine whether the dispatch decision requires a reset of the airplane systems. It is thus able to define an indication of any definite or potential need to reset the aircraft 12.

The application for establishing a detailed status is further able to scan the verifications associated with each item from the minimum equipment list in the database 46, and optionally the procedures associated with each potentially implicated piece of equipment in the database to assist with isolating items 48, in the configurations list database 49, and/or in the maintenance and operating database 50 in order to determine an estimate of the time needed to carry out the procedures.

It is thus able to define an estimate of the minimum time needed to establish the dispatch advantageously in the form of the minimum time needed, gradually increasing (for example greater than 10 minutes, greater than one hour, greater than four hours).

The application for establishing a detailed status is further able to scan the elements associated with each item from the minimum equipment list in the database 46 in order to determine whether an operational limitation must be put in place. This operational limitation is for example a maximum flight level that may be reached, or a landing distance increased by a certain length.

The application for establishing a detailed status is further able to compute, in real time, a number of flights or a remaining time for a dispatch for example given in remaining days or a deadline from the moment at which the dispatch began, based on information recovered from the minimum equipment list database 46.

Figure 2:
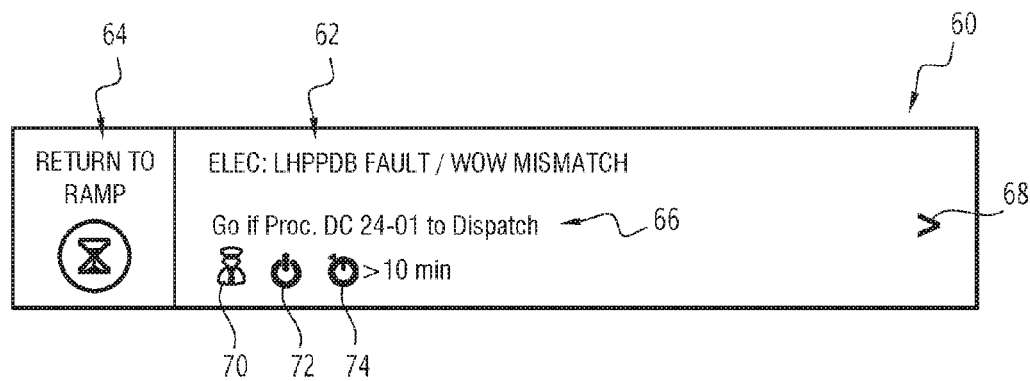
FIG. 2 is a synthesis window assisting in the decision displayed by the system of FIG. 1.

The display management module 58 on the display 52 is able to generate, on a monitor of the display 52, for each defect and/or fault signature associated with a potentially implicated piece of equipment and/or system and/or function, a dispatch synthesis window 60, an example of which is shown in FIG. 2.

The synthesis window 60 includes at least one region for displaying an indicator 62 of the observed defect and/or fault type, a region for displaying a rapid dispatch status indicator 64 developed by the rapid status determination application of the synthesis module 56. The synthesis window 60 further advantageously includes a region for displaying an indicator 66 of procedures to be carried out, and a status 68 of the performance of the procedures to be carried out.

The synthesis window 60 further includes a region for displaying detailed dispatch status indicators 70 to 81 developed by the detailed status determination application of the synthesis module 56.

In the specific example shown in FIG. 2, here corresponding to a portable electronic device, the display region of the indicator 62 is situated in the upper part of the window. The indicator 62 is formed by synthetic text illustrated the type of defects, here "ELEC: LHPPDB FAULT/WOW MISMATCH" to indicate that the electrical system of the aircraft has detected a possible defect on the gear.

Figures 3, 4:
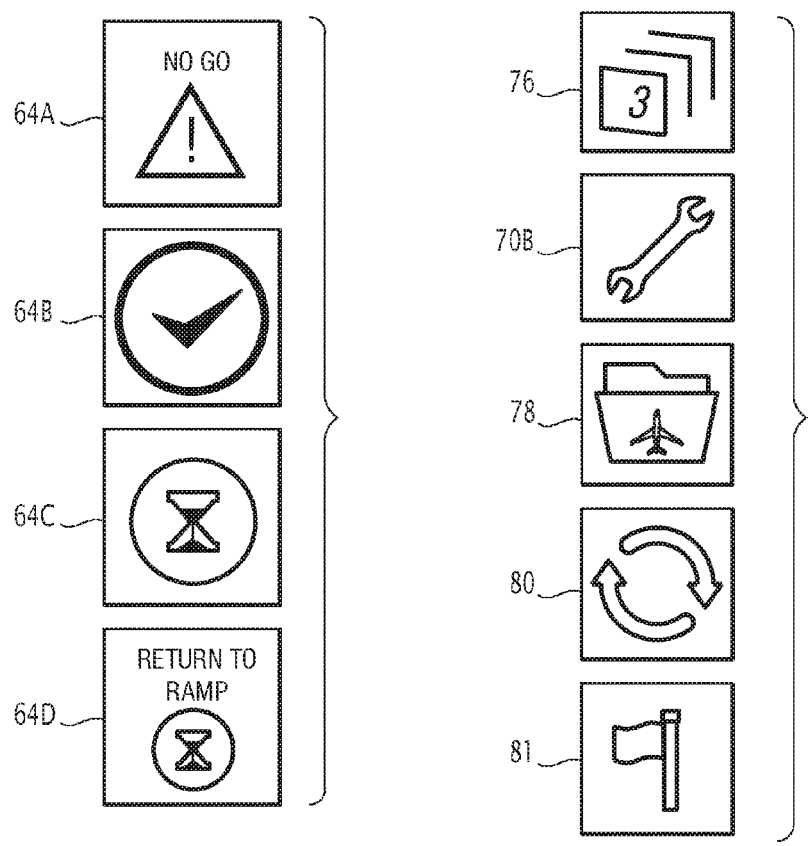
FIG. 3 illustrates several rapid status icons indicating the very short-term impact of the dispatch of the aircraft, able to be displayed in the window of FIG. 2.
FIG. 4 illustrates several detailed operational impact status icons able to be displayed in the window of FIG. 2.

The display region of the rapid dispatch status indicator 64 is situated in the left part of the window. The indicator 64 is formed by an icon corresponding to the determined status type. FIG. 3 illustrates different types of icons forming the indicator 64 respectively corresponding to a non-dispatch (icon 64A), a dispatch (icon 64B), an on-site analysis to be done (icon 64C), and an analysis require a return to ramp (icon 64D).

The procedure type indicator 66 is able to provide an indication of the type of procedure to be followed, for example from databases 48 or 50, so as to establish a dispatch. In this example, the indicator 66 is a text message. Here, it states "Go if Proc. DC24-01 to Dispatch".

In this example, the region for displaying detailed status indicators 70 to 81 is situated at the bottom of the synthesis window 60. At least one detailed status indicator 70 relates to the need to request outside assistance. In the case at hand, the indicator 70 is formed by an icon shown in FIG. 2 and which indicates that the crew does not need outside assistance. Alternatively or additionally, the icon 70B shown in FIG. 4 can be displayed to indicate the need to obtain outside assistance.

The detailed status indicator 72 relates to the need to reset airplane systems. It is formed by a specific icon. Advantageously, the indicator is differentiated to establish either a potential reset or a definite reset.

The detailed status indicator 74 is formed by an icon estimating the time needed to develop the dispatch, which in this example is greater than 10 minutes.

Other icons forming detailed status indicators are shown in FIG. 4. The icon 76 is intended to indicate that several items from the minimum equipment list may correspond to the present defect and/or fault signature and that a dispatch choice must be chosen by the crew based on the limiting conditions to be met.

The icon 78 is intended to indicate that the defect/fault in question is under dispatch and comes from the recordal in the technical report document (electronic or paper) completed upon returning from a mission, after an earlier flight.

The icon 80 is intended to indicate that a dispatch extension has been granted.

The icon 81 is intended to indicate an operational limitation resulting from the dispatch to the crew.

The display 52 includes a monitor 90 on which at least one synthesis window 60 is displayed. The monitor 90 is for example a display monitor of the unit 18 of the cockpit, or a screen of a portable electronic device such as a tablet.

An icon 200 indicating the operational state of the aircraft, on the ground or in flight, can also be displayed on the display 52.

A method for assisting with the dispatch decision using the system 10 will now be described in light of FIGS. 5 to 10.

Initially, the aircraft 12 provided with the system 10 is situated at its ramp (point A in FIG. 6).

The crew activates the system 10. The icon 200 indicates that the aircraft is on the ground. The crew notices that a defect is already present on a system of the aircraft 12, i.e., "COND CABIN FAULT—ONE CABIN ZONE TEMP SENSOR FAIL".

As indicated by the icon 78, this defect comes from a technical report from a prior flight and has previously been addressed. A synthesis window 60 is displayed on the monitor 90 with a rapid status indicator 64 indicating a dispatch.

The synthesis window 60 further has an indicator 92 of the remaining number of flights or time for the dispatch, i.e., in this case for calendar days ("Remaining time: 4 calendar days"). The remaining time indicator is for example given in remaining days or expiration date, the crew being able to choose the type of remaining time being displayed.

The synthesis window 60 further has an indicator 94 that indicates the item under which the dispatch associated with this defect was obtained.

The synthesis window 60 therefore allows the crew to easily track what dispatch was obtained and how much time remains for the current dispatch, in particular when the aircraft 12 is passed from one crew to another.

The aircraft 12 is then moved to the runway (point B in FIG. 6), where it performs pre-takeoffs verifications. During these verifications, a new defect appears, i.e., "ELEC: LHP-PDB FAULT/WOW MISMATCH".

Figure 5:
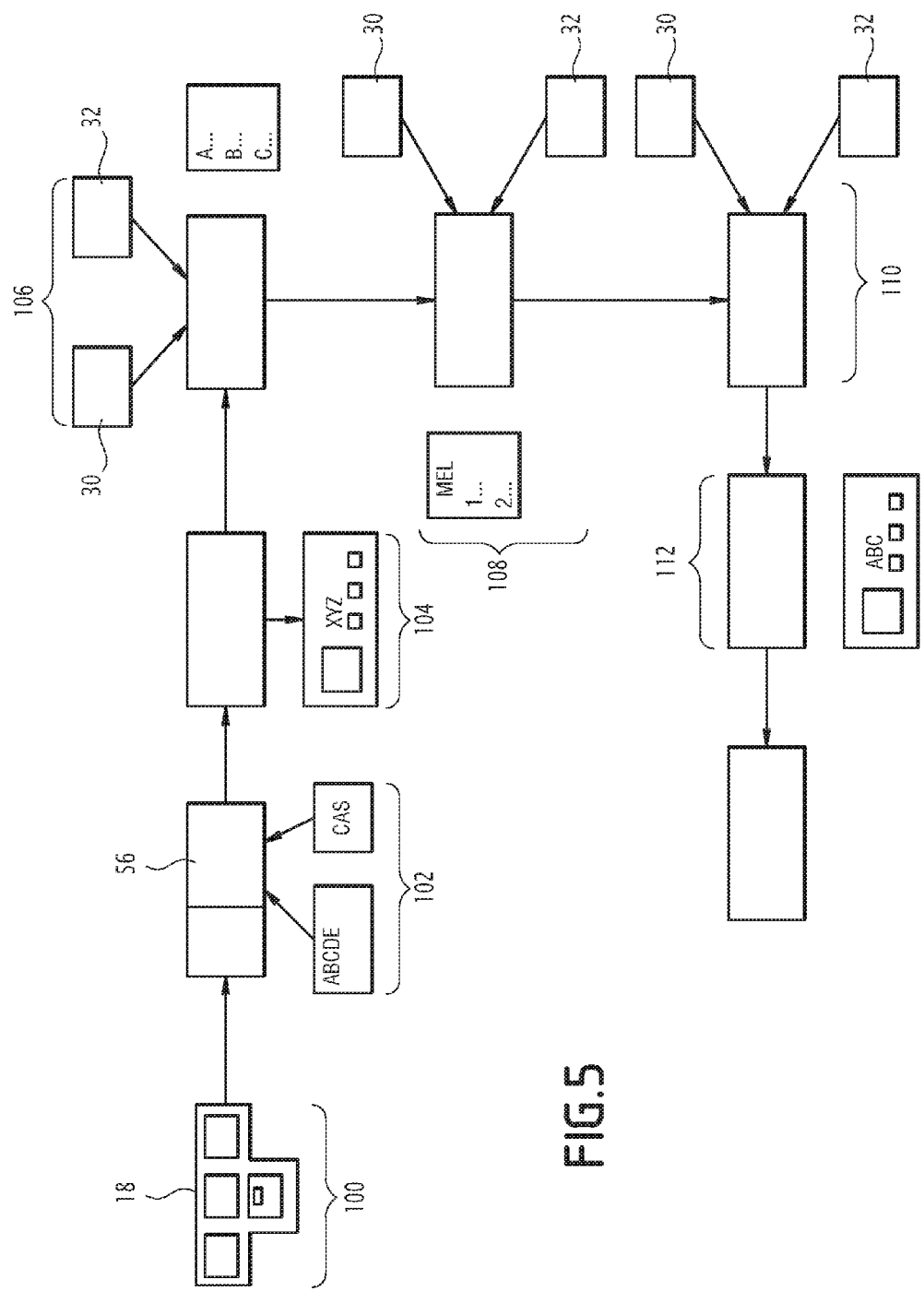
FIG. 5 is a flowchart illustrating the successive steps for implementing a method for assisting in the dispatch decision, implemented using the system of FIG. 1.

The data acquisition module 54 detects the presence of this defect, which is also displayed on the monitors of the display unit 18, as illustrated by step 100 in FIG. 5.

The rapid status determination application then collects the signature of the defect in step 102. It queries the identification database 44 and/or the database 48 in order to determine which piece of equipment and/or system and/or function may be implicated in the appearance of this defect. In this example, the database 44 does not allow direct identification of the implicated piece of equipment. The database 48 indicates that according to this signature, and subject to the performance of a specific procedure, the implicated piece of equipment could be the front landing gear.

Advantageously, the rapid status determination application scans the fleet problem database 51 in order to verify that the displayed defect is not an artifact. It next scans the database 48 assisting with the isolation and orientation toward items on the minimum equipment list to determine whether one or several items corresponding to this piece of equipment exist.

In the present case, at least one item from the minimum equipment list is found in the database 46. Furthermore, the rapid status determination application determines, from the database 46, that a verification specific to this item must be carried out, and that this verification requires returning to the ramp.

The status determination application therefore develops a rapid dispatch status, consisting of "analysis requiring a return to ramp". As illustrated by FIG. 8, this status is displayed in the form of a rapid status indicator 64 that is made up of an icon in the display region of the rapid status indicator, in step 104.

This rapid status allows the crew to decide quickly to return to the ramp to perform the analysis.

At the same time, the detailed status determination application determines, from the databases 48, 46, that the procedure to be followed to identify the potentially implicated piece of equipment and the verifications to be carried out corresponding to the item associated with the potentially implicated piece of equipment can be done by the crew alone. It also queries the maintenance and operating procedures database 50 in order to verify that no other necessary procedure requires outside maintenance.

It therefore develops a detailed status comprising a determination of the necessary outside assistance, in which the analysis may be conducted by the crew alone and displays a corresponding detailed status indicator 70, in the form of an icon representing only the crew.

Likewise, the detailed status determination application determines, from the databases 48, 46, that the procedure to be followed and the verifications to be carried out require resetting airplane systems, and a procedure time greater than 10 minutes.

The status determination application also determines, from the database 46, whether any operational limitations exist associated with each relevant item from the minimum equipment list.

It therefore generates a detailed status comprising a need to reset the aircraft systems to carry out the procedure, an estimate of the time necessary to develop a dispatch, and optionally the presence of any operational limitations.

The display management module 58 then displays, in the window, indicators 72, 74 respectively corresponding to an indication of the need to reset the aircraft 12 systems and an estimated necessary time exceeding 10 minutes.

The crew can therefore talk with air traffic control and the mission management staff, and also warn passengers of the delay and potential outages of the airplane systems affecting them. It returns to the ramp (point C in FIG. 6).

The rapid and detailed statuses displayed in the synthesis window 60 are developed quickly by the system 10, for example less than 10 seconds after the appearance of a defect or fault, without the crew having to scan documents or carry out an analysis.

In step 106 visible in FIG. 5, the crew consults the database 48 to assist with isolating items, so as to carry out the procedure making it possible to identify the implicated piece of equipment, and the item associated with this piece of equipment in the minimum equipment list.

The procedure is optionally carried out using the data from the automatic defect detection software application 30, and advantageously using the automatic display and performance application 32 for the procedure.

In step 108, the crew performs the verifications associated with the item from the minimum equipment list corresponding to the potentially implicated piece of equipment. As before, the verifications are done using the data from the automatic defect detection software application 30, and advantageously using the automatic display and performance application 32.

In step 110, the crew optionally carries out the procedures from the maintenance and operating procedures database 52 corresponding to the implicated piece of equipment, optionally using the automatic defect detection software application 30 and the display and automatic performance software application 32 for the procedures.

In step 112, the crew determines whether the conditions for establishing a dispatch defined in each affected item of the minimum equipment list are met, and if applicable, what the operational limitations are, in particular in number of flights and/or time. This information is entered by the crew or recovered automatically by the synthesis module 56.

It is sent to the display management module 58 to allow the display of an indicator 92 showing the remaining time for the dispatch, defined by a remaining number of flights in which the dispatch is valid.

As illustrated in FIG. 9, the window 64 corresponding to the observed defects then shows a dispatch rapid status indicator 64, and a remaining time indicator 92 indicating a number of flights.

In reference to point D in FIG. 6, the crew moves the aircraft 12 from the ramp to the runway and takes off at point E.

During the flight, as illustrated in point F, the decision assistance system 10 remains active. The icon 200 indicates that the aircraft is in flight.

When a new defect and/or fault is detected by the software application 30, this defect is recovered by the data acquisition module 54 and is sent to the synthesis module 56.

The rapid status determination application is activated to measure the impact of the defect and/or fault on the next flight. The display management module 58 then displays an indicator 98 corresponding to a required analysis for the next flight.

The detailed status determination application performs the same operations as described above and determines detailed status indicators, in particular to determine the affected item in the minimum equipment list, any need for outside assistance, and the operating time.

A specific status window 60 is added on the monitor 90 in a category relative to defects with possible impact for the mission/next flights.

The crew can therefore anticipate the actions to be performed once the aircraft 12 has touched down, and optionally plan for diversion if maintenance is necessary and not available at the anticipated destination.

Thus, in the example shown in FIG. 10, the observed defect is "FUEL: X-TK-3-1 FAULT/TRANSFER FAULT", which corresponds to a fuel transfer fault between tanks 3 and 1. Here, the implicated system is ensuring the ability to transfer fuel between tanks 3 and 1.

One particular item from the minimum equipment list is isolated by the operational synthesis module 56, as well as the need to involve both the crew and maintenance, and an estimated operating time greater than 10 minutes.

The status windows 60 corresponding to the other defects that are already under dispatch are grouped together in a specific category on the monitor 90 ("Defects under dispatch").

The system 10 therefore simplifies the crew's work on the ground by providing a dispatch rapid synthesis and/or optionally a detailed synthesis in addition to the rapid synthesis. The crew therefore has quasi-immediate information on the actions and time that will be necessary to decide on any dispatch in the presence of the observed defect and/or fault. This saves considerable time.

Furthermore, non-dispatch cases due to abandonment following the complexity of the analysis are reduced.

When a detailed synthesis is provided, the need to return to the ramp to analyze the defects and/or fault is identified, as well as the need for staff and the necessary resources. Passengers and the cabin crew are provided with information on the consequences of the fault. The time impact of the fault is also anticipated, which makes it possible to manage the mission, and revise any available slots with air traffic control.

This operational synthesis is updated in real time, in particular in flight, which facilitates the monitoring of actions by the crew, and the passing of instructions between several crews.

When the synthesis is carried out in flight, the crew's workload is reduced, the mission staff can be informed of the potential consequences of the fault, and the needs for maintenance staff and technical resources at the destination airport can be anticipated. Any diversion to a location with the necessary support can be considered, limiting the risks of having to send a repair team to an inappropriate location.

In the alternative where the system 10 is integrated into the central avionics unit 16, the acquisition module 54, the operational synthesis module 56 and the display management module are directly loaded in the avionics unit 16, in a memory 42 shared with or separate from the memory 28, to be executed by a computer 40 shared with or separate from the computer 26.

The display 52 is advantageously formed by a monitor of the display unit 18 in the cockpit. The shape and arrangement of the synthesis window 60 can be different from that shown in FIG. 2.

Additionally or alternatively, the applications for determining the status of the operational synthesis module 56 can compare the time elapsed or the number of flights made since a dispatch associated with a given defect and/or fault was established, with a maximum number of flights or time provided for said dispatch, recovered from the minimum equipment list database 46. The rapid status determination application is able to define a non-dispatch rapid status if the number of flights made reaches the maximum number of flights or if the elapsed time exceeds the maximum time.

Advantageously, previous flight data are stored in a database. These data are for example maintenance data, identified defect/faults, equipment and/or systems and/or functions references. The acquisition module 54 is capable of acquiring these data.

Potentially, the acquisition module 54 is able to query units external to the central avionics unit 16 to recover defects and/or fault identification data.

In a variant, a rapid dispatch status, consisting of "analysis requiring a long time" is substituted to the rapid dispatch status consisting of "analysis requiring a return to ramp".

Contrary to the "analysis requiring a return to ramp", the crew can choose to carry out a new analysis at the most appropriate place based on the airport context. Potentially, the detailed dispatch status application in addition to the rapid dispatch status allows the crew to refine its choice between carrying out an analysis at the current location of the aircraft and carrying out an analysis at the ramp.

Advantageously, the detailed dispatch status indicates whether a crew action is required outside of the aircraft. The crew can opt to continue the procedure at the current location of the aircraft, at a parking point, or elsewhere, as a function of this detailed dispatch status.

Advantageously, when the aircraft 12 is on the ground or in flight, the system 10 sends information collected during analysis which have been carried out to teams on the ground.

Preferentially, these information are in the form of an analysis report. Using this report, the ground teams anticipate the maintenance operation for solving the identified aircraft faults.

In the case of business aviation, crew members have often several allocated roles. It is therefore necessary, in order to avoid disagreement to the clients, to help the crew anticipate and plan at best the actions to be taken.

The system simplifies the crew tasks by presenting a synthesis window which participates to the decision making of the crew. The crew has almost immediate information on the actions and on the time frame which are going to be necessary to decide a potential dispatch, in view of the noted defect(s) and/or fault(s).

What is claimed is:

1. A system for assisting in a dispatch decision of an aircraft, comprising:
    an acquisition module configured for acquiring aircraft defect and/or fault data;
    at least one first identification database, configured to associate at least one potentially implicated piece of equipment and/or system and/or function of the aircraft with at least one defect and/or fault datum of the aircraft received from the acquisition module;
    a second minimum equipment list database defining dispatch conditions of the aircraft based on potentially implicated equipment and/or systems and/or functions of the aircraft;
    a synthesis module, configured to generate at least one dispatch status for the aircraft, based on at least one defect and/or fault datum of the aircraft received from the acquisition module and on at least data contained in the first identification database and in the second minimum equipment list database; and
    a display, configured to display at least one synthesis window containing at least one defect and/or fault identification indicator of the aircraft generated from the or each defect and/or fault datum, and at least one dispatch status indicator based on the dispatch status determined by the synthesis module,
    the synthesis module being configured to simultaneously generate at least one rapid dispatch status for the aircraft and at least one detailed dispatch status establishing an operational impact,
    the at least one rapid dispatch status being based on at least one defect and/or fault datum of the aircraft received from the acquisition module and on at least data contained in the first identification database and in the second minimum equipment list database, the rapid dispatch status being determined from among a non-dispatch, an established dispatch, an analysis capable of being done on-site, an analysis requiring a long time and/or an analysis requiring a return to ramp,
    the at least one detailed dispatch status establishing the operational impact based on at least one defect and/or fault datum of the aircraft received from the acquisition module and on at least data contained in the first identification database and in the second minimum equipment list database,
    the display being configured to simultaneously display, in the synthesis window, at least one rapid dispatch status indicator based on the rapid dispatch status determined by the synthesis module and at least one detailed dispatch status indicator based on the detailed dispatch status determined by the synthesis module.

2. The system according to claim 1, wherein the detailed dispatch status generated by the synthesis module includes at least one piece of information regarding a procedure to be followed from the minimum equipment list to decide on the dispatch, the display being configured to display a detailed status indicator identifying the procedure to be followed based on the information regarding the procedure to be followed generated by the synthesis module.

3. The system according to claim 1, wherein the detailed dispatch status generated by the synthesis module includes at least one piece of information estimating the minimum time necessary for the dispatch decision, the display being configured to display a detailed status indicator giving an estimate of the minimum time necessary to establish the dispatch based on the minimum time estimate information generated by the synthesis module.

4. The system according to claim 1, wherein the detailed dispatch status generated by the synthesis module includes a piece of information regarding the need for outside assistance to decide on the dispatch, the display being configured to display a detailed status indicator relative to a need for outside assistance based on the need for outside assistance information generated by the synthesis module.

5. The system according to claim 1, wherein the detailed dispatch status generated by the synthesis module includes a piece of information regarding the need to reset the systems of the aircraft to decide on the dispatch, the display being configured to display a detailed status indicator relative to a reset need based on the reset need information generated by the synthesis module.

6. The system according to claim 1, wherein the detailed dispatch status generated by the synthesis module includes a piece of information regarding an operational limitation of the aircraft on at least one upcoming flight, the display being configured to display a detailed status indicator relative to the operational limitation based on the operational limitation information generated by the synthesis module.

7. The system according to claim 1, wherein the synthesis module is configured to establish at least one detailed dispatch status on the ground and in flight constituting an estimate for an upcoming departure, the display being configured to display the or each operational impact detailed status on the ground and in flight.

8. The system according to claim 1 further comprising at least one database to assist with isolation and orientation toward an item from the minimum equipment list, an operating and maintenance procedures database, and/or a deviation configuration list database, the synthesis module being configured to generate at least one dispatch status from the data contained in the database to assist with isolation and orientation toward an item from the minimum equipment list, in the operating and maintenance procedure database, and/or in the deviation configuration list database.

9. The system according to claim 1 further comprising at least one fleet defect and/or fault database, the synthesis module further being configured to query the fleet defect and/or fault database in the presence of a defect and/or fault datum collected by the acquisition module.

10. The system according to claim 1, wherein, after a dispatch is established in the presence of a defect and/or fault datum of the aircraft, the display is configured to display a remaining number of flights and/or duration indicator for the dispatch in the synthesis window.

11. A method for assisting in a dispatch decision of an aircraft including the following steps:
providing the system according to claim 1;
acquiring, by the acquisition module, at least one defect and/or fault datum of the aircraft;
generating, by the synthesis module, a dispatch status for the aircraft, based on at least one defect and/or fault datum of the aircraft received from the acquisition module and on at least data contained in the first identification database and in the second minimum equipment list database; and
displaying, in a synthesis window of the display, at least one defect and/or fault identification indicator of the aircraft and a dispatch status indicator determined by the synthesis module based on the defect and/or fault datum of the aircraft.

12. The method according to claim 11 further comprising generating at least one rapid dispatch status of the aircraft, based on at least one defect and/or fault datum of the aircraft received from the acquisition module and on at least data contained in the first identification database and in the second minimum equipment list database, the rapid dispatch status being determined from among a non-dispatch, an established dispatch, an analysis that may be done on-site, an analysis requiring a long time and/or an analysis requiring a return to ramp, the display displaying, in the synthesis window, at least one rapid dispatch status indicator based on the rapid dispatch status generated by the synthesis module.

13. The method according to claim 11 further comprising generating at least one detailed dispatch status establishing an operational impact, based on at least one defect and/or fault datum of the aircraft received from the acquisition module and on at least data contained in the first identification database and in the second minimum equipment list database, the display displaying, in the synthesis window, at least one detailed dispatch status indicator based on the detailed dispatch status generated by the synthesis module.

* * * * *